United States Patent
Mori et al.

(10) Patent No.: US 11,538,292 B2
(45) Date of Patent: Dec. 27, 2022

(54) TRAVEL CONTROL DEVICE, TRAVEL CONTROL SYSTEM, TRAVEL CONTROL METHOD, AND TIRE TESTING DEVICE

(71) Applicant: BRIDGESTONE CORPORATION, Tokyo (JP)

(72) Inventors: Ryosuke Mori, Tokyo (JP); Masaki Segawa, Tokyo (JP); AbdAlrahman AlaaEldeen Mohammad Aboulelaa, Tokyo (JP); Rintaro Kamihira, Tokyo (JP); Kim Samba, Tokyo (JP); Jiajun Lu, Tokyo (JP); Tsutomu Shiobara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 17/260,554

(22) PCT Filed: Jul. 16, 2019

(86) PCT No.: PCT/JP2019/027968
§ 371 (c)(1),
(2) Date: Jan. 15, 2021

(87) PCT Pub. No.: WO2020/017510
PCT Pub. Date: Jan. 23, 2020

(65) Prior Publication Data
US 2021/0272398 A1    Sep. 2, 2021

(30) Foreign Application Priority Data

Jul. 17, 2018    (JP) .............................. JP2018-134563

(51) Int. Cl.
*G07C 5/08* (2006.01)
*G07C 5/00* (2006.01)
(Continued)

(52) U.S. Cl.
CPC .......... *G07C 5/0816* (2013.01); *B60W 50/14* (2013.01); *B60W 60/00* (2020.02); *G01M 17/02* (2013.01);
(Continued)

(58) Field of Classification Search
None
See application file for complete search history.

(56) References Cited

U.S. PATENT DOCUMENTS 6,580,980 B1    6/2003    Gauthier et al.
9,139,056 B2    9/2015    Breuer et al.
(Continued)

FOREIGN PATENT DOCUMENTS

CN    103189252 A    7/2013
CN    106468592 A    3/2017
(Continued)

OTHER PUBLICATIONS

Jan. 19, 2021, International Preliminary Report on Patentability issued in the International Patent Application No. PCT/JP2019/027968.
(Continued)

*Primary Examiner* — Abdhesh K Jha
(74) *Attorney, Agent, or Firm* — Kenja IP Law PC

(57) ABSTRACT

This travel control device is provided with a controller for controlling travel of a vehicle fitted with tires, using automated driving. The vehicle travels on a course including a testing section for testing the tire. The controller controls travel of the vehicle so that the vehicle travels on the testing section based on a prescribed standard for testing of the tire.

7 Claims, 5 Drawing Sheets

(51) Int. Cl.
*B60W 60/00* (2020.01)
*B60W 50/14* (2020.01)
*G01M 17/02* (2006.01)

(52) U.S. Cl.
CPC ....... *G07C 5/008* (2013.01); *B60W 2050/143* (2013.01)

(56) References Cited

U.S. PATENT DOCUMENTS

| | | | |
|---|---|---|---|
| 9,283,814 B2* | 3/2016 | Hayashi | ............... B60C 11/04 |
| 10,974,549 B2* | 4/2021 | Murata | ............ B60C 11/0304 |
| 2003/0187556 A1 | 10/2003 | Suzuki | |
| 2010/0004810 A1 | 1/2010 | Tagawa | |
| 2018/0079419 A1 | 3/2018 | Takeshi | |
| 2019/0291513 A1 | 9/2019 | Tamura | |

FOREIGN PATENT DOCUMENTS

| | | | | |
|---|---|---|---|---|
| CN | 108081875 A | | 5/2018 | |
| CN | 108225790 B | * | 7/2020 | .......... G01M 17/007 |
| DE | 102004003099 A1 | | 8/2005 | |
| EP | 1460409 A1 | | 9/2004 | |
| EP | 3819609 A1 | | 5/2021 | |
| JP | H04310109 A | * | 8/1991 | |
| JP | H04310109 A | | 11/1992 | |
| JP | H0836691 A | | 2/1996 | |
| JP | 2000019071 A | | 1/2000 | |
| JP | 2003322592 A | | 11/2003 | |
| JP | 2003344206 A | | 12/2003 | |
| JP | 2010015496 A | | 1/2010 | |
| JP | 2013092452 A | | 5/2013 | |
| JP | 2018069853 A | | 5/2018 | |
| JP | 2018132502 A | | 8/2018 | |
| JP | 2020006725 A | | 1/2020 | |

OTHER PUBLICATIONS

Oct. 21, 2019, International Search Report issued in the International Patent Application No. PCT/JP2019/027968.

Feb. 17, 2022, search result of the Extended European Search Report issued by the European Patent Office in the corresponding European Patent Application No. 19838053.7.

Anonymous, "The Contidrom turns 50—tire test facility more important than ever for Continental", Jul. 3, 2017, pp. 1-5, XP055883906, Retrieved from the Internet: URL:https://www.continental.com/de/presse/pressemitteilungen/50-jahre-contidrom/, retrieved on Jan. 26, 2022.

Anonymous, "Bridgestone Launches Development Project focused on Using Automated Driving for Tire Tests News | Bridgestone", Jul. 18, 2018, pp. 1-2, XP055883895, Retrieved from the Internet: URL:https://www.bridgestone.com/corporate/news/2018071801.html, retrieved on Mar. 7, 2022.

Anonymous, "Continental Pioneers Tire Tests With Self-Driving Test Vehicles", Dec. 19, 2018, pp. 1-5, XP055883950, Retrieved from the Internet: URL:https://www.continental.com/de/presse/pressemitteilungen/reifentests-mit-selbstfahrendem-testfahrzeug/, retrieved on Jan. 26, 2022.

Anonymous, "Uniform provisions concerning the approval of tyres with regard to rolling sound emissions and/or to adhesion on wet surfaces and/or to rolling resistance", UN-R117-02-S08, Jan. 20, 2016, pp. 1-97, XP055764356, Retrieved from the Internet: URL:http://www.mlit.go.jp/common/001159001.pdf, retrived on Jan. 13, 2021.

Sep. 22, 2022, search result of Office Action issued by the China National Intellectual Property Administration in the corresponding Chinese Patent Application No. 201980047738.4.

* cited by examiner

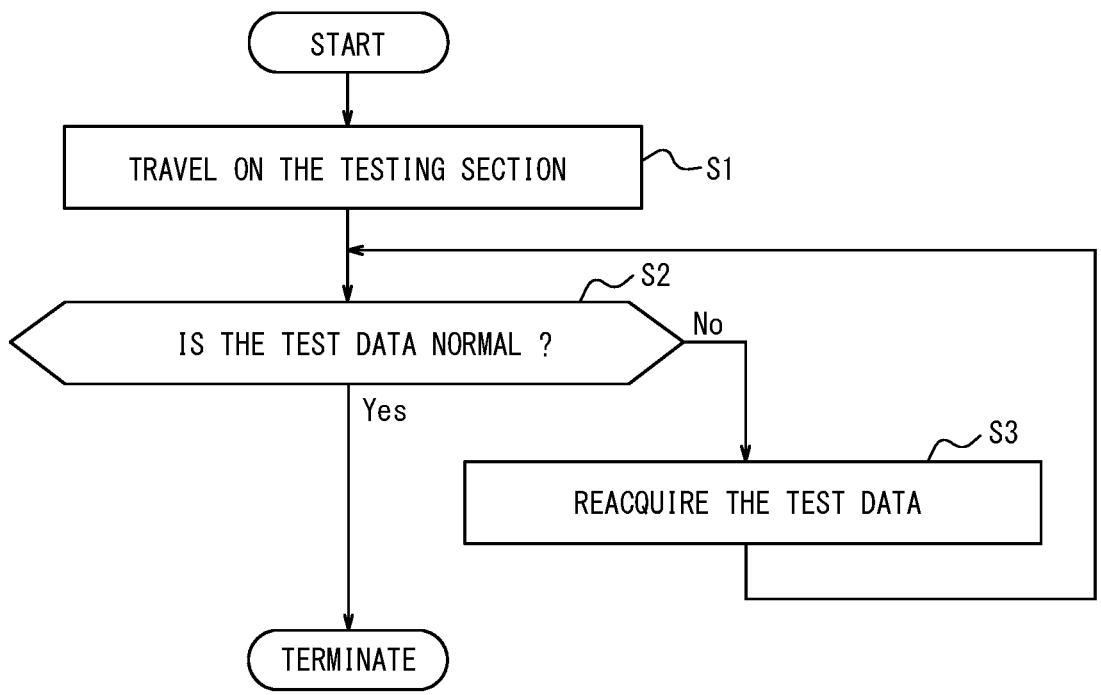

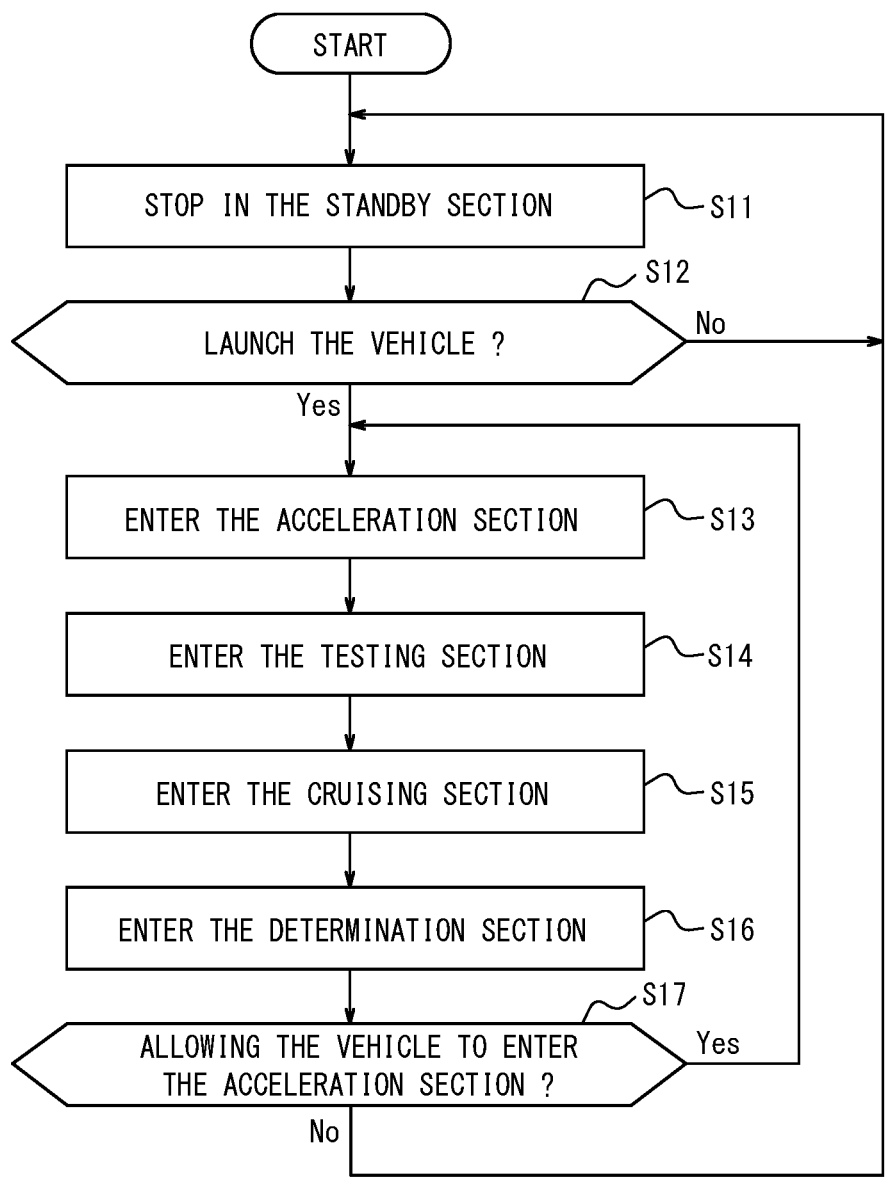

TRAVEL CONTROL DEVICE, TRAVEL CONTROL SYSTEM, TRAVEL CONTROL METHOD, AND TIRE TESTING DEVICE

CROSS REFERENCE TO RELATED APPLICATION

This application claims the benefit of the priority of Japanese Patent Application No. 2018-134563, filed Jul. 17, 2018, the contents of which are incorporated herein by reference.

TECHNICAL FIELD

The present invention relates to a travel control device, a travel control system, a travel control method, a tire testing device, and a tire testing method.

BACKGROUND

Conventionally, a configuration in which warning guidance is provided according to type of tire fitted to a vehicle is known (for example, Patent Literature 1 and the like).

CITATION LIST

Patent Literature

PTL 1: JP 2010-15496 A

SUMMARY

Technical Problem

A performance test of tire may be performed by traveling a vehicle fitted with various tires based on a prescribed standard for testing the tire. Efficiency improvement of the performance test of tire is required.

An objective of the present invention, conceived in view of above-mentioned problems is to provide a travel control device for efficiently traveling a vehicle fitted with various tires based on a prescribed standard, a travel control system and a travel control method.

Solution to Problem

A travel control device according to an embodiment of the present invention comprises a controller for controlling travel of a vehicle fitted with tires, using automated driving, wherein the vehicle travels on a course including a testing section for testing the tire, and the controller controls travel of the vehicle so that the vehicle travels on the testing section based on a prescribed standard for testing of the tire.

A travel control system according to an embodiment of the present invention comprises a travel control device for controlling travel of a vehicle fitted with tires, using automated driving, and a sensor for detecting information for the vehicle, wherein the vehicle travels on a course including a testing section for testing the tire, and the travel control device controls travel of the vehicle so that the vehicle travels on the testing section based on a prescribed standard for testing of the tire.

A travel control method according to an embodiment of the present invention includes steps of: detecting information for a vehicle traveling on a course including a testing section for testing the fitted tires; and controlling travel of the vehicle using automated driving based on the information for the vehicle so that the vehicle travels on the testing section based on a prescribed standard for testing of the tire.

A tire testing device according to an embodiment of the present invention comprises a controller for controlling travel of a vehicle fitted with tires, using automated driving, wherein the vehicle travels on a course including a testing section for testing the tire, and the controller causes the vehicle to travel on the testing section based on a prescribed standard for testing of the tire and to acquire test data of the tire in the testing section.

A tire testing method according to an embodiment of the present invention includes steps of: controlling a vehicle fitted with tires, that is traveling on a course including a testing section for testing the tire, using automated driving; and causing the vehicle to travel on the testing section based on a prescribed standard for testing of the tire and to acquire test data for the tires in the testing section.

Advantageous Effect

According to a travel control device, a travel control system, a travel control method, ae tire testing device, and a tire testing method according to an embodiment of the present invention, vehicles fitted with various tires can be efficiently travelled based on a prescribed standard.

BRIEF DESCRIPTION OF THE DRAWINGS

In the accompanying drawings:

FIG. 5 is a flowchart showing an example of a procedure for controlling travel of vehicles based on test conditions.

FIG. 6 is a flowchart showing an example of a procedure for controlling travel of vehicles that go around a course.

DETAILED DESCRIPTION

Figure 1:
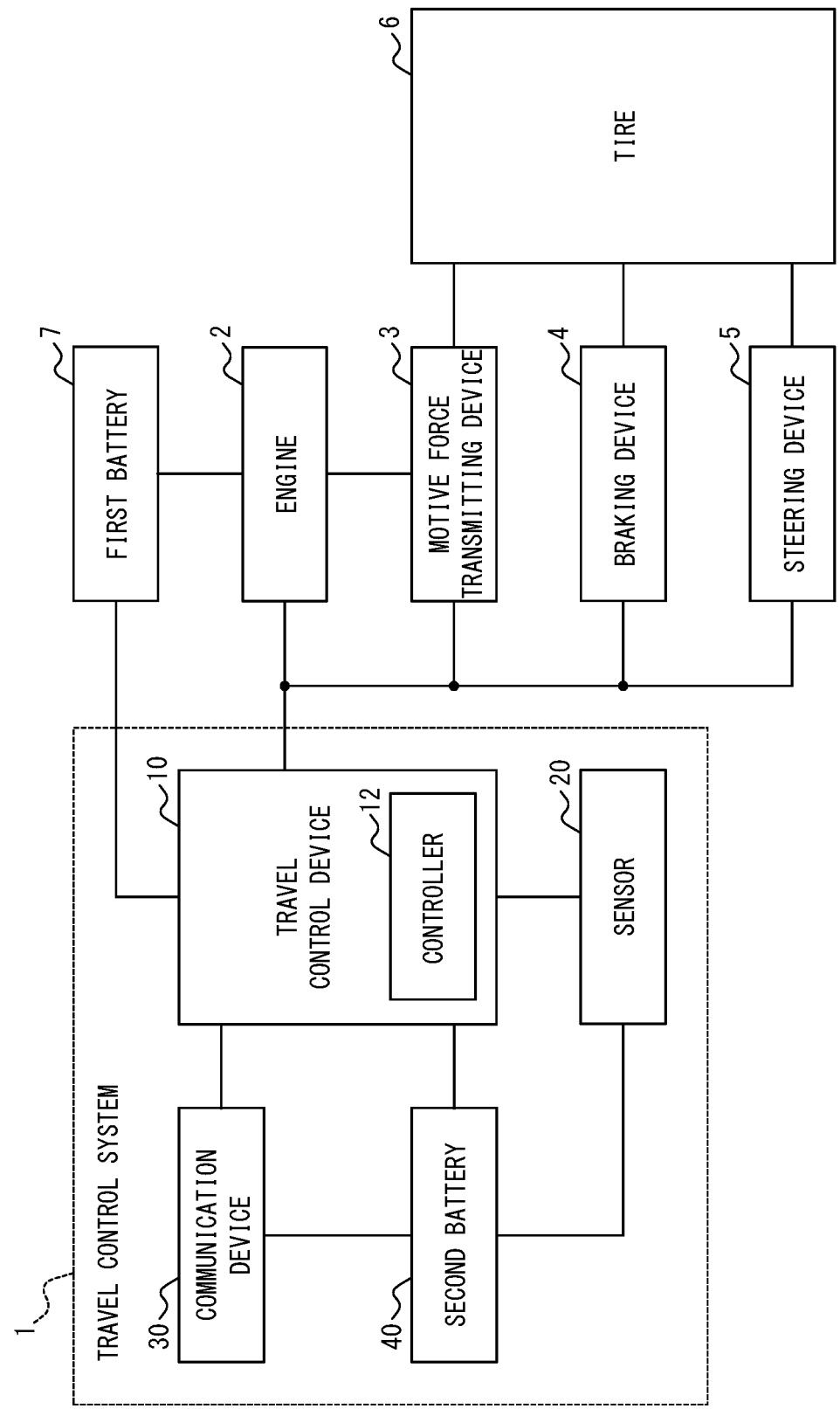
FIG. 1 is a block diagram showing a configuration example of a vehicle comprising a travel control system according to an embodiment.

As shown in FIG. 1, a vehicle 100 according to an embodiment comprises a travel control system 1, an engine 2, a motive force transmission device 3, a braking device 4, a steering device 5, a tire 6, and the first battery 7. The motive force transmission device 3 comprises transmissions or the like. The braking device 4 comprises brakes or the like. The steering device comprises steering or the like. The vehicle 100 may be provided with a motor instead of the engine 2 as a power source, or may comprise both the engine 2 and the motor.

The vehicle 100 is assumed to be automatedly driven by the travel control system 1. The level of the automated driving may be levels 3 to 5 as defined by SAE (Society of Automotive Engineers).

The vehicle 100 uses power of the first battery 7 to start the engine 2. The vehicle 100 may comprise a variety of electrical or electronic equipment or the like. The vehicle 100 may operate electrical or electronic equipment or the like using power of the first battery 7 or power of an alternator generated by power of the engine 2. The first battery 7 may be a secondary battery, such as a lead storage battery or a lithium-ion battery.

The vehicle 100 launches or accelerates by transmitting power generated by the engine 2 to the tire 6 via the motive force transmission device 3. The vehicle 100 decelerates or stops by the braking device 4 controlling the tire 6. The vehicle 100 controls traveling direction by the steering device 5 controlling the tire 6.

The travel control system 1 according to an embodiment comprises a travel control device 10 and a sensor 20. The travel control device 10 controls travel of the vehicle 100, using automated driving, by controlling the engine 2, the motive force transmission device 3, the braking device 4, and the steering device 5. The travel control device 10 comprises the controller 12. The controller 12 may comprise an arithmetic unit such as a CPU (Central Processing Unit) or the like. The controller 12 may comprise a storage device such as a memory or the like. The travel control device 10, apart from the controller 12, may comprise a storage unit.

The sensor 20 detects information for the vehicle 100. The information for the vehicle 100 may include information for the state of the vehicle 100, such as position, speed or the like of the vehicle 100. The information for the vehicle 100 may include information for situation around the vehicle 100. The sensor 20 may acquire information from various meters, such as a speed meter, a tachometer, a fuel meter, or an odometer, provided in the vehicle 100. The sensor 20 may comprise a position sensor for detecting its own position using a positioning system such as GPS (Global Positioning System). The sensor 20 may comprise a GPS speed sensor utilizing GPS to detect speed of the vehicle 100. The sensor 20 may comprise a camera for capturing surroundings of the vehicle 100. The sensor 20 may comprise an infrared sensor or a millimeter wave sensor or the like for detecting objects located around the vehicle 100.

The travel control system 1 may further comprise a communication device 30. The communication device 30 may comprise, for example, a communication interface such as a LAN (Local Area Network) or the like. The communication device 30 may wirelessly communicate with other devices via the communication interface.

The travel control system 1 may further comprise the second battery 40. The second battery 40 may be a primary battery or a secondary battery. The second battery 40 may supply power to each component of the travel control system 1. The travel control system 1 may be powered from the first battery 7 mounted on the vehicle 100 when the travel control system 1 does not comprise the second battery 40.

Figure 2:
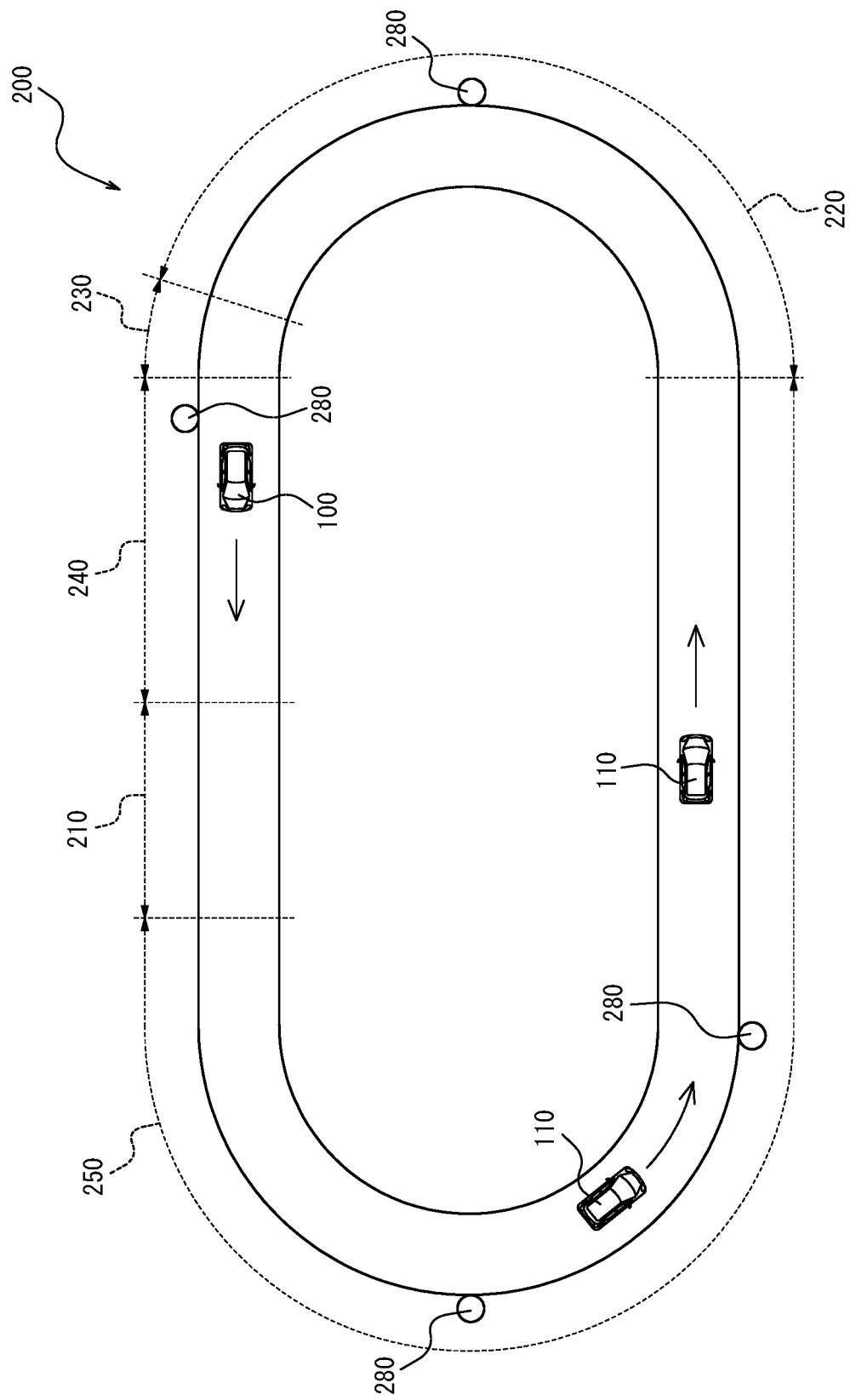
FIG. 2 is a plan view showing an example of a course on which the vehicle travels.

As shown in FIG. 2, the vehicle 100 travels on a course 200. The course 200 has a testing section 210 for testing the tire 6 of the vehicle 100. In this embodiment, the testing of the tire 6 is assumed to be a passing noise test. The passing noise test is also referred to as PBN (Pass By Noise) tests. The passing noise test is carried out based on a prescribed standard for the testing of the tire 6. The prescribed standard may be, for example, a ECE R117-02 that is an international standard according to tire unit noise restrictions. A road surface in the testing section 210 may be a road surface based on ISO10844 standard. Test data in the passing noise test includes noise level of running noise generated by friction between the tire 6 and a road surface when the vehicle 100, fitted with the tire 6, travels. In the passing noise test, test data is acquired so that the running noise of the vehicle 100 does not include driving sound of the engine 2 or the motor of the vehicle 100. To do so, the travel control system 1 or the travel control device 10 controls travel of the vehicle 100 so that the vehicle 100 passes through the testing section 210 with the engine 2 or the motor stopped. Traveling in a state where the engine 2 or the motor is stopped while the vehicle 100 is traveling is also referred to as coasting. Test data based on ECE R117-02 include noise level of running noise acquired by causing the vehicle 100 to travel at eight or more test speeds of approximately equal spacing in a range of ±10 km/h relative to the reference speed. After the vehicle 100 is fitted with a new tire 6, a break-in run of the vehicle 100 is carried out by the time starting the testing of the tire 6. The break-in run is to cause the vehicle 100 to travel for a predetermined distance. Travel distance for the break-in run is determined by a prescribed standard. The testing of the tire 6 is not limited to PBN tests and may be other test.

Figure 3:
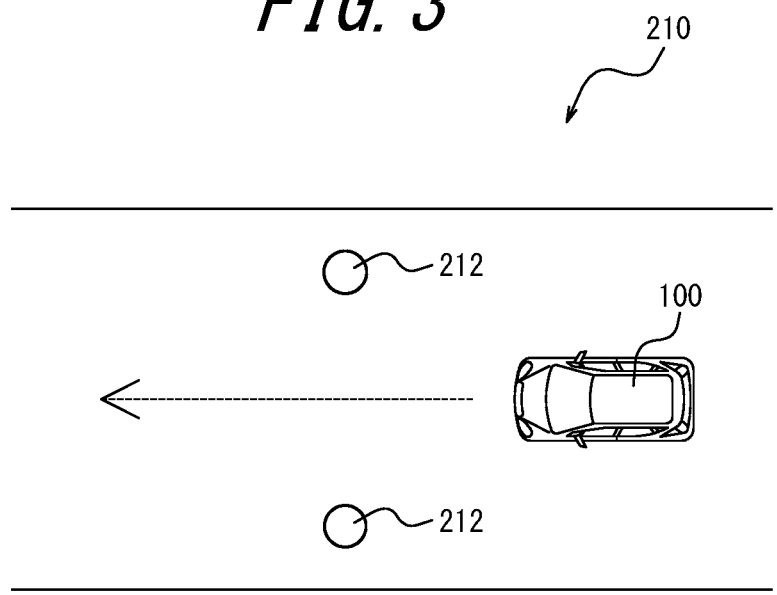
FIG. 3 is a plan view showing an example of a testing section.

As shown in FIG. 3, two microphones 212 are provided in the testing section 210. In the testing section 210, the vehicle 100 travels on a route indicated by dashed arrow. The microphone 212 is located on the left and right as seen from the vehicle 100 and is equidistant from the route on which the vehicle 100 will travel. In other words, the travel control system 1 controls travel of the vehicle 100 so that the vehicle 100 passes through the center of the position where the two microphones 212 are provided side by side. The microphone 212 detects the noise level of the running noise of the vehicle 100 while the vehicle 100 is passing through the testing section 210 and acquires the noise level as test data for the tire 6. The microphone 212 is also referred to as a testing device. The testing section 210 may be provided with a speedometer for measuring the speed at which the vehicle 100 passes between the microphones 212. The speedometer may be in various forms, such as a laser speedometer.

Test data detected by the two microphones 212 located on the left and right as seen from the vehicle 100 is determined whether it is normal data based on a prescribed standard. For example, when difference in noise levels detected by each of the left and right microphones 212 is equal to or greater than a prescribed value, the test data is determined not to be normal. When difference between speed of the vehicle 100 in detecting test data and test speed is equal to or greater than a prescribed value, the test data is determined not to be normal.

Figure 4:
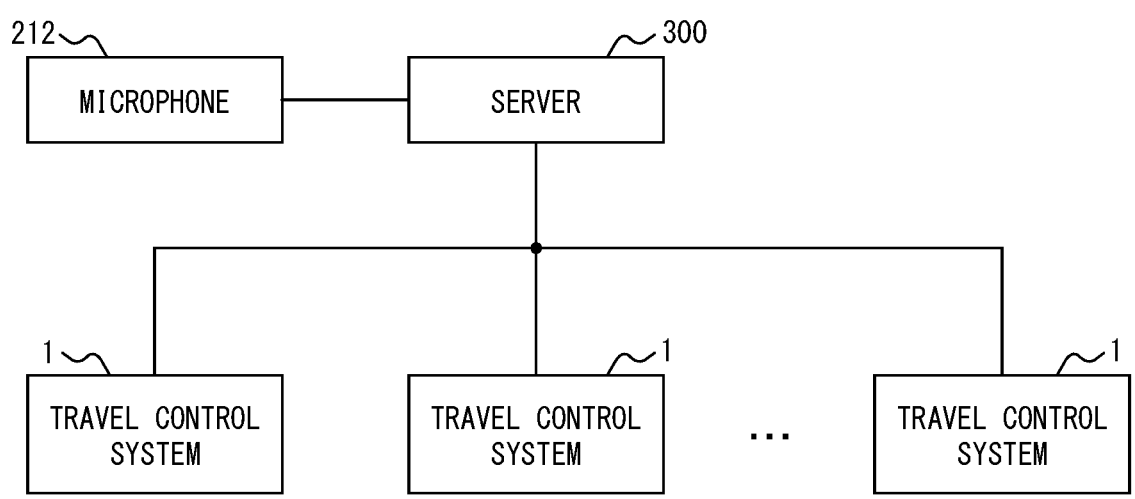
FIG. 4 is a block diagram showing a configuration example of a server for managing a plurality of travel control systems.

As shown in FIG. 4, the travel control system 1 mounted on the vehicle 100 may be communicatively connected to the server 300. The server 300 is also referred to as an external device. The server 300 may be connected to the travel control system 1 via the communication device 30. The server 300 is communicatively connected to the microphone 212 provided in the testing section 210 and acquires test data from the microphone 212. A number of the travel control system 1 to be connected to the server 300 may be 1 or 2 or more.

The server 300 shall manage test data of the tire 6. The server 300 transmits traveling conditions of the vehicle 100 for the testing of the tire 6 to the travel control system 1 of the vehicle 100 fitted with the tire 6 to be tested. The traveling conditions of the vehicle 100 for the testing of the tire 6 are also referred to as test conditions. Test conditions may include information for a prescribed standard. The test conditions may include a reference speed of the vehicle 100 in acquiring test data. Test conditions may include a number of test data to be acquired. Test conditions may include standard for determining whether acquired test data is normal. The travel control device 10 causes the vehicle 100 to travel based on the test conditions, thereby the test data of the tire 6 that the vehicle 100 is fitted with is acquired by the microphone 212.

The travel control device 10 acquires test data from the server 300, based on the test conditions, may determine whether the test data is normal. The travel control device 10, when determining the test data not to be normal, may cause the vehicle 100 to travel on the testing section 210 so as to reacquire the test data. The travel control device 10 may cause the vehicle 100 to travel so as to reacquire only the test data that was not normal, or may cause the vehicle 100 to travel so as to reacquire all the test data included in the test conditions. The travel control device 10, when determining the test data to be normal, may terminate the travel control of the vehicle 100 based on the test conditions. The travel control device 10 terminates the control based on the determination result of the test data, thereby possibility of retesting the tire 6 is reduced. As a result, the efficiency of the testing of the tire 6 is increased.

The server 300 may determine whether the acquired test data is normal. The travel control device 10 may acquire a determination result of whether the test data is normal from the server 300. The travel control device 10, from the server 300, when acquiring a determination result representing that the test data is not normal, may cause the vehicle 100 to travel on the testing section 210 so as to reacquire the test data. The travel control device 10 may terminate the travel control of the vehicle 100 based on the test conditions when the determination result representing that the test data is normal is acquired from the server 300. The server 300, when determining the acquired test data is normal, may transmit an instruction to the travel control device 10 to terminate the travel control of the vehicle 100 based on the test conditions. The travel control device 10 may terminate the travel control of the vehicle 100 based on the test conditions according to an instruction from the server 300. In this way, the efficiency of the testing of the tire 6 is increased.

The controller 12 of the travel control device 10 may control travel of the vehicle 100 so that the server 300 can acquire test data for the tire 6 according to the procedure of the flowchart exemplified in FIG. 5.

The controller 12 causes the vehicle 100 to travel on the testing section 210 so that the microphone 212 can acquire test data based on the test conditions (step S1). The microphone 212 transmits test data to the server 300. The controller 12 is assumed to proceed to step S4 after carrying out travel for acquiring all the test data included in the test conditions.

The controller 12 determines whether the test data is normal (step S2). The controller 12 acquires test data from the server 300, and may determine whether the test data is normal based on the test conditions. The controller 12 may acquire a result that the server 300 determines whether the test data is normal based on the test conditions from the server 300.

The controller 12, when the test data is normal (step S2: Yes), terminates the procedure of the flowchart in FIG. 5. The controller 12, when the test data is not normal (step S2: No), causes the vehicle 100 to travel on the testing section 210 so that the microphone 212 can reacquire the test data (step S3). The controller 12, after step S3, returns to the procedure of determination in step S2.

The controller 12, in step S1, may proceed to step S2 after carrying out travel for acquiring one test data. In this case, the controller 12, when determining that the test data is normal in the procedure of determination in step S2, returns to step S1 and carries out travel for acquiring other test data.

As shown in FIG. 2, not only the vehicle 100 but also the other vehicle 110 travel on the course 200. That is, the vehicle 100 travels on the course 200 mixed with the other vehicle 110. The other vehicle 110 are also referred to as the other vehicle. The other vehicle 110 may travel by operation by drivers. The other vehicle 110, by being provided with the travel control system 1, similarly to the vehicle 100, may travel regardless of the operation by drivers.

In the course 200, when the vehicle 100 travels mixed with the other vehicle 110, the vehicle 100 and the other vehicle 110 may each travel on the course 200 according to prescribed rules. The prescribed rules may include the same content in the vehicle 100 controlled by the travel control device 10 and the other vehicle 110 that are driven manually by drivers, or may include different content. The travel control device 10 may acquire information for position of the other vehicle from the sensor 20 and control travel of the vehicle 100 based on the information for position of the other vehicle. In this way, the vehicle 100 can share the course 200 with the other vehicle 110. As a result, the utilization efficiency of the testing section 210 for testing the tire 6 is improved. That is, efficiency of the testing of the tire 6 is improved.

For example, prescribed rules may include content that controls travel of the vehicle 100 so that the vehicle 100 does not overtake the other vehicle 110. In this way, the vehicle 100 can be travelled safely even if the situation further ahead than the other vehicle 110 is blocked by the other vehicle 110 in view of the sensor 20 and is not detected by the sensor 20.

While the other vehicle 110 are traveling on the testing section 210, if the vehicle 100 enters the testing section 210, the running noise of the other vehicle 110 overlaps the test data of the vehicle 100. In this case, the microphone 212 cannot normally acquire test data for the tire 6 that the vehicle 100 is fitted with. Thus, when the course 200 includes the testing section 210, the prescribed rule shall include content that controls travel of the vehicle 100 so that the vehicle 100 does not enter the testing section 210 while the other vehicle 110 is traveling on the testing section 210. The travel control device 10 may acquire information for position or speed of the other vehicle based on detection result of the sensor 20. The travel control device 10 may control travel of the vehicle 100 based on information for position or speed of the other vehicle.

As shown in FIG. 2, the course 200 may have a standby section 230 in addition to the testing section 210. The travel control device 10, while the other vehicle 110 is traveling on the testing section 210, if the vehicle 100 possibly enters the testing section 210, stops the vehicle 100 in the standby section 230.

The course 200 may have an acceleration section 240 between the standby section 230 and the testing section 210. The travel control device 10 controls speed of the vehicle 100 in the acceleration section 240, causes the vehicle 100 to pass between the microphones 212 at the test speed when the vehicle 100 coasts in the testing section 210. The course 200 may include a determination section 220 before the standby section 230. The travel control device 10, while the vehicle 100 is traveling on the determination section 220, determines whether the vehicle 100 may travel on the testing section 210. The travel control device 10, when not determining the vehicle 100 may travel on the testing section 210, may control travel of the vehicle 100 so that the vehicle 100 does not enter the acceleration section 240. In other words, the travel control device 10 may control travel of the vehicle 100 so that after the vehicle 100 enters the acceleration section 240, the vehicle 100 travels on the testing section 210 without stopping.

The course 200 may include a detection device 280 that detects presence of the other vehicle. The detection device 280 may be located beside road surface of the course 200 or on the road surface of the course 200. The detection device 280 may include a detection device, such as, for example, an infrared sensor, or may include an imaging device, such as a camera. The detection device 280 includes a communication device in communication with the travel control system 1 and may transmit a detection result to the travel control system 1. The detection device 280 may detect position or speed of the other vehicle traveling on the course 200. The detection device 280 includes a communication device for communicating with the other vehicle and may detect position or speed of the other vehicle by communication.

The travel control device 10 acquires information for the other vehicle from the detection device 280 and may control travel of the vehicle 100 based on the information. The information for the other vehicle includes presence of the other vehicle, position, speed, or the like. In this way, the accuracy of the travel control based on the relationship with the other vehicle is improved.

The travel control device 10 may control travel of the vehicle 100 based on the detection result of at least one of the sensor 20 and the detection device 280 while the vehicle 100 is traveling on the determination section 220. The travel control device 10 may detect the presence of the other vehicle in the acceleration section 240 and the testing section 210 based on the detection results of at least one of the sensor 20 and the detection device 280. The travel control device 10 may detect position or speed of the other vehicle in the acceleration section 240 and the testing section 210 based on the detection result of at least one of the sensor 20 and the detection device 280. The travel control device 10, based on information for the other vehicle in the acceleration section 240 and the testing section 210, may determine whether the vehicle 100 may travel on the testing section 210. By the travel control device 10 determining whether the vehicle 100 may travel on the testing section 210 based on information for the other vehicle, safety in the case where the vehicle 100 travels on the course 200 mixed with the other vehicle is improved. Travel control device 10, based on the positions and speed of the other vehicle traveling on the acceleration section 240 and the testing section 210, may calculate the time for the other vehicle passing through the testing section 210, and determine, based on the time, whether the vehicle 100 may enter the acceleration section 240.

The course 200 may have markers so that the vehicle 100 can recognize the position of its own vehicle. The markers may be displayed by white lines or the like, for example, on the road surface of the course 200. In this case, the vehicle 100 may read the marker by the sensor 20 and recognize the position of its own vehicle. The markers may be readable by communication, such as RFID (Radio Frequency Identification) tags, for example. In this case, the vehicle 100 may recognize the position of its own vehicle by communicating with the markers by the sensor 20 and reading the positional information of the markers.

The course 200 may comprise a gate system that restricts the entry of the vehicle 100. The gate system may be included in the standby section 230. The gate system may comprise a gate for informing the vehicle 100 of whether the entry is acceptable. The gate system may close the gate to prevent the other vehicle 110 from entering the acceleration section 240, for example, when the vehicle 100 is traveling on the testing section 210. That is, the gate system may control the opening and closing of the gate based on the positional information of the vehicle 100 and the other vehicle 110 in the course 200. The gate may be a visual representation of the availability of an entry, such as a traffic light, or may be an obstacle, such as a bar. In this case, the travel control device 10 may detect the state of the signal or bar by the sensor 20 and determine whether to let the vehicle 100 enter. The gate may transmit information to the vehicle 100 indicating an availability of entry by communication. In this case, the travel control device 10, according to the availability of entry included in the received information, may determine whether to allow the vehicle 100 to enter.

The travel control device 10, before the vehicle 100 enters the acceleration section 240, based on the detection result of at least one of the sensor 20 and the detection device 280, determines whether the vehicle 100 may enter the acceleration section 240. If the travel control device 10 does not determine that the vehicle 100 may enter the acceleration section 240, the travel control device 10 stops the vehicle 100 in the standby section 230. If the travel control device 10 determines that the vehicle 100 may enter the acceleration section 240, the travel control device 10 controls travel of the vehicle 100 so that the vehicle 100 launches from the standby section 230, or passes through the standby section 230.

The travel control device 10, after launching the vehicle 100 from the standby section 230, accelerates the vehicle 100 to a speed faster than the test speed so that the vehicle 100 decelerates in the acceleration section 240 while coasting in the testing section 210 and travels at the test speed between the microphones 212. The travel control device 10 coasts vehicle 100 in testing section 210 so that microphone 212 can acquire test data for the tire 6. The course 200 may include a cruising section 250 after testing section 210. The travel control device 10, after the vehicle 100 passes through the testing section 210, causes the vehicle 100 to travel on the cruising section 250, and to return to the determination section 220.

The controller 12 of the travel control device 10 may control travel of the vehicle 100 on the course 200 according to the procedure of the flowchart shown in FIG. 6.

The controller 12 stops the vehicle 100 in the standby section 230 (step S11).

The controller 12 determines whether to launch the vehicle 100 (step S12). The controller 12, even if launching the vehicle 100, when the vehicle 100 does not enter the testing section 210 while the other vehicle 110 is traveling on the testing section 210, may determine to launch the vehicle 100. The controller 12, based on information from the detection device 280, may determine whether to launch the vehicle 100.

The controller 12, when determining not to launch the vehicle 100 (step S12: No), returns to step S11, and continues to keep the vehicle 100 in the standby section 230. The controller 12, when determining to launch the vehicle 100 (step S12: Yes), causes the vehicle 100 to launch, and to enter the acceleration section 240 (step S13). The controller 12 controls the speed of the vehicle 100 so that the vehicle 100 can pass between the microphones 212 at the test speed in the acceleration section 240.

The controller 12 causes the vehicle 100 to enter the testing section 210 (step S14). The controller 12 stops the engine 2 or the motor of the vehicle 100 and coasts the vehicle 100. While the vehicle 100 is passing through the testing section 210, the microphone 212 is detecting test data for the tire 6 fitted to the vehicle 100.

The controller 12 causes the vehicle 100 to enter the cruising section 250 (step S15). The controller 12 controls travel of the vehicle 100 based on prescribed rules, and causes the vehicle 100 to travel to the determination section 220.

The controller 12 causes the vehicle 100 to enter the determination section 220 (step S16).

The controller 12, while the vehicle 100 is traveling on the determination section 220, determines whether to allow the vehicle 100 to enter the acceleration section 240 (step S17). That is, the controller 12, while the vehicle 100 is traveling on the determination section 220, determines whether to cause the vehicle 100 to pass through the standby section 230 or to stop the vehicle 100 in the standby section 230. The controller 12, when determining to allow the vehicle 100 to enter the acceleration section 240 (step S17: Yes), proceeds to the procedure of step S13 and causes the vehicle 100 to enter the acceleration section 240. The controller 12, when determining not to allow the vehicle 100 to enter the acceleration section 240 (step S17: No), proceeds to the procedure of step S11 and stops the vehicle 100 in the standby section 230.

As a comparative example, if the other vehicle 110 is fitted with the tire 6 to be tested, at least one driver who has mastered the skills to be able to drive the other vehicle 110 based on the prescribed standard for the testing of the tire 6 is required. It takes time and money for drivers to master the skills to drive the other vehicle 110 based on the prescribed standard for the testing of the tire 6.

On the other hand, the vehicle 100 according to the present embodiment, by provided with the travel control device 10, travels using automated driving. When the tire 6 to be tested is fitted with the vehicle 100, the vehicle 100 travels using automated driving and acquires the test data of the tire 6. When the vehicle 100 travels using automated driving, the vehicle 100 may be driven unattended, or may be driven with a driver who has not mastered the skills to drive based on the prescribed standard for testing of the tire 6. That is, when the vehicle 100 travels using automated driving, the driver, who has mastered the skills to drive based on the prescribed standard for testing of the tire 6, is not required. As a result, time and cost of having drivers master the skills is reduced. Further, the test data of the tire 6 is collected on the server 300.

In this case, one operator can confirm the status of test data acquisition in a plurality of vehicles 100 in parallel by confirming the server 300. As a result, it is possible to efficiently cause the vehicle 100 fitted with various tires 6 to travel based on the predetermined standard. As a result, the vehicle 100 fitted with various tire 6s can be travelled efficiently based on the prescribed standard. An operator who confirms the server 300 may or may not master the driving skills. As a result, the time and cost of having the driver master the skills is reduced. As described above, by allowing the travel control device 10 to control the travel of the vehicle 100 using automated driving, the acquisition of the test data for the tire 6 is streamlined.

When determining that the test data is not normal, the travel control device 10 may notify an alarm indicating that the test data is not normal. The recipient of the alarm may be the operator who checks the server 300, or the driver of the vehicle 100. By notifying the alarm, reacquisition of the tire 6 test data is facilitated. As the result, the acquisition of test data for the tire 6 is streamlined.

The travel control system 1 and the travel control device 10 according to the present disclosure are not limited to the specific configuration shown in the above-described embodiments, but can be variously modified and changed as long as it does not depart from the scope of the claims.

The travel control system 1 or the travel control device 10 according to the present disclosure may be used as a tire testing device to acquire test data for the tire 6. The travel control system or the travel control device 10 according to the present disclosure can carry out the tire testing method for the acquisition of test data for the tire 6.

REFERENCE SIGNS LIST

1: Travel control system, 2: engine, 3: motive force transmission device, 4: braking device, 5: steering device, 6: tire, 7: first battery, 10: travel control device, 12: controller, 20: sensor, 30: communication device, 40: second battery, 100: vehicle, 110: the other vehicle, 200: course, 210: testing section, 212: microphone, 220: determination section, 230: standby section, 240: acceleration section, 250: cruising section, 280: detection device, 300: server

The invention claimed is:

1. A travel control device for testing of a passing noise of tires fitted to a vehicle, comprising a controller for controlling travel of the vehicle, using automated driving, wherein
the vehicle travels on a course including a testing section for testing the tire and a determination section,
the vehicle travels on the course mixed with an other vehicle,
the course comprises a detection device that detects presence of the other vehicle,
the controller controls travel of the vehicle so that the vehicle travels on the testing section based on a prescribed standard for testing of the tire so that the vehicle accelerates before entering the test section and coasts in the testing section with an engine or motor of the vehicle stopped,
the controller controls travel of the vehicle based on information about position of the other vehicle and detection result of the other vehicle by the detection device,
the controller, while the vehicle is traveling on the determination section before the vehicle enters the testing section, determines the vehicle may travel on the testing section when an absence of the other vehicle in the testing section is detected by the detection device, and
the travel control device is configured to control travel of the vehicle based on the detection result of at least one of a velocity of the vehicle or objects located around the vehicle.

2. The travel control device, according to claim 1, wherein the controller acquires test data of the tire, and determine whether the test data of the tire is normal.

3. The travel control device, according to claim 2, wherein the controller, when the test data of the tire is not normal, controls travel of the vehicle so that the vehicle travels on the testing section based on the prescribed standard.

4. The travel control device, according to claim 2, wherein the controller, when the test data of the tire is not normal, notifies an alarm.

5. A travel control method for testing of a passing noise of tires fitted to a vehicle, the method including steps of:
detecting information for the vehicle traveling on a course including a testing section for testing the tires and a determination section, wherein the vehicle travels on the course mixed with an other vehicle, and the course comprises a detection device that detects presence of the other vehicle;

controlling travel of the vehicle using automated driving based on the information for the vehicle so that the vehicle travels on the testing section based on a prescribed standard for testing of the tire, wherein accelerating the vehicle before entering the test section, in which the testing of the tire is performed while the vehicle coasts with an engine or motor of the vehicle is stopped, controlling the travel of the vehicle based on information about position of the other vehicle and detection result of the other vehicle by the detection device, determining, while the vehicle is traveling on the determination section before the vehicle enters the testing section, the vehicle may travel on the testing section when an absence of the other vehicle in the testing section is detected by the detection device, and controlling the travel of the vehicle based on the detection result of at least one of a velocity of the vehicle or objects located around the vehicle.

6. A tire testing device, comprising a controller for controlling travel of a vehicle fitted with tires, using automated driving, wherein the vehicle travels on a course including a testing section for testing the tire and a determination section, the vehicle travels on the course mixed with the other vehicle, the course comprises a detection device that detects presence of the other vehicle, the controller causes the vehicle to travel on the testing section based on a prescribed standard for testing of the tire and to acquire test data of the tire in the testing section so that the vehicle accelerates before entering the test section and coasts in the testing section with an engine or motor of the vehicle stopped, the controller controls travel of the vehicle based on information about position of the other vehicle and detection result of the other vehicle by the detection device, the controller, while the vehicle is traveling on the determination section before the vehicle enters the testing section, determines the vehicle may travel on the testing section when an absence of the other vehicle in the testing section is detected by the detection device, and the travel control device is configured to control travel of the vehicle based on the detection result of at least one of a velocity of the vehicle or objects located around the vehicle.

7. The travel control device, according to claim 3, wherein the controller, when the test data of the tire is not normal, notifies an alarm.

* * * * *